No. 870,376.
PATENTED NOV. 5, 1907.
J. W. MANLEY.
CONTACT GALVANOMETER.
APPLICATION FILED SEPT. 29, 1906.
2 SHEETS—SHEET 1.
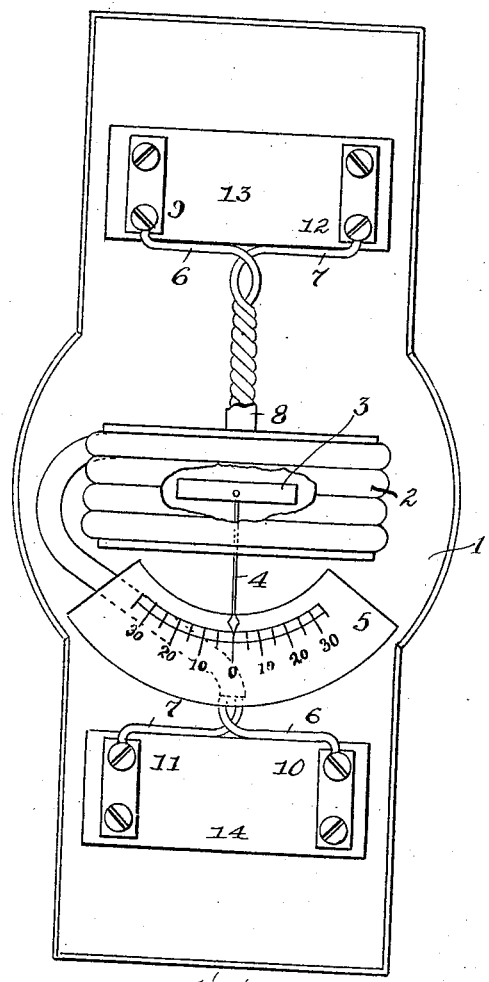
WITNESSES:
INVENTOR
John William Manley,
BY
ATTORNEYS.

No. 870,376. PATENTED NOV. 5, 1907.
J. W. MANLEY.
CONTACT GALVANOMETER.
APPLICATION FILED SEPT. 29, 1906.
2 SHEETS—SHEET 2.
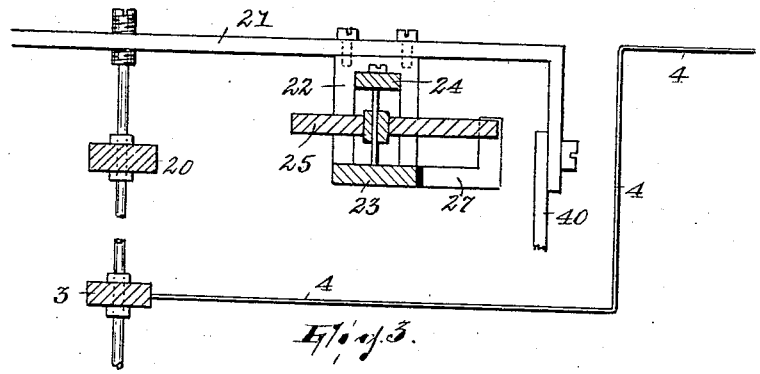
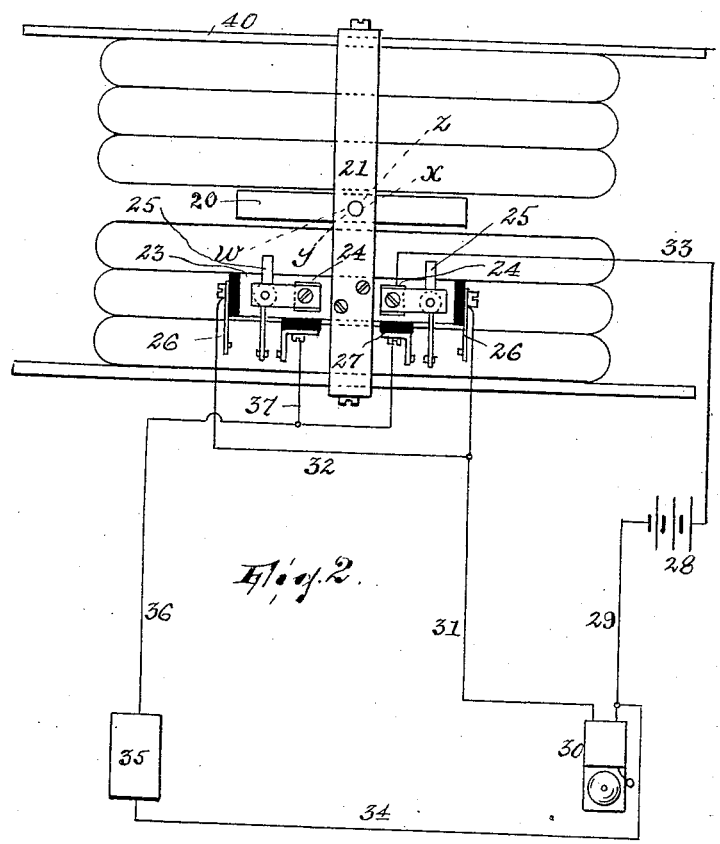
WITNESSES:
INVENTOR,
John William Manley.
BY
Arthur Steward.
ATTORNEYS.

UNITED STATES PATENT OFFICE.

JOHN WILLIAM MANLEY, OF NEW BARNET, ENGLAND, ASSIGNOR OF ONE-HALF TO THE ELECTRIC SAFETY APPLIANCES COMPANY, LIMITED, OF LONDON, ENGLAND.

CONTACT-GALVANOMETER.

No. 870,376.  Specification of Letters Patent.  Patented Nov. 5, 1907.

Application filed September 29, 1906. Serial No. 336,791.

*To all whom it may concern:*

Be it known that I, JOHN WILLIAM MANLEY, of New Barnet, England, residing in Segary Villa, Hadley Road, in the county of London, have invented a certain new and useful Contact-Galvanometer; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

A known type of coil for electric measuring and indicating apparatus consists of two separate windings each carrying a current. In conjunction with this coil a magnetic needle or magnet fitted with a pointer is employed, and when current traverses both of the windings the needle or pointer will take up a position depending mainly upon the difference between the two currents passing. If the two currents be exactly equal and the distance of the windings or to speak more correctly the mean distance of the turns of each winding be equal then the pointer will take up a median position which is usually a zero position. But it is practically impossible to get the two windings placed at an equal distance as aforesaid and one part of my invention consists in making two such windings equally distant from the magnet or body to be influenced by the currents in the two windings. This part of my invention consists in bringing the two conductors intended to constitute the two windings together and twisting them round one another before they reach the spool or bobbin upon which they are to be wound. They are then wound upon the spool still twisted round one another in a helical direction after which they are led from the spool for some little distance still twisted together. In practice I prefer that the two conductors shall be attached to binding screws both before reaching and after leaving the spool and that thereafter they be separated to terminals in the usual way.

Figure 1 is a plan view of the apparatus when used as a measuring or indicating means; Fig. 2 is a plan view of the apparatus when used as a leak detecting and circuit breaking means; and, Fig. 3 is a longitudinal sectional view, *i. e.*, axially of the coils formed of the two conductors, of what is shown in Fig. 2.

My arrangement is particularly applicable to instruments for indicating or obviating leakage from conductors of electricity. In one such instrument constituting a part of my invention I employ a coil comprising two windings twisted round one another as aforesaid and adapted to act upon a magnetic needle or magnet bearing a pointer. I shall hereafter refer to the magnetic needle or the magnet and the pointer as the movable element. I illustrate a preferred form of this in Fig. 1 of the accompanying drawings. In the said Fig. 1 is the case of the instrument with the cover removed and 2 the coil or fixed element of the instrument in this case shown as flattened. This coil is illustrated as broken away at the center in order to display the magnet 3 which lies within the flattened coil 2 and to which is attached the pointer 4 whose free end traverses the scale 5 whose zero point is at the center. In the case illustrated the winding of the coil 2 consists of two separate wires insulated from and twisted round each other and made into a cable as shown in the figure, 6 and 7 being the two insulated wires and 8 the covering of the cable. If a current traverses one of these wires in one direction the magnet and with it the pointer will be deflected in one or other direction depending upon the direction of the current. If a current traverses the other wire in the opposite direction the magnet and pointer will be deflected in the other direction. If currents traverse both wires in opposite directions then if the turns of the two wires be equidistant and equal in number and if the currents be similar no deflection will take place as the current in the two wires will balance one another. If however the currents be unequal then the direction of deflection will depend upon the wire which has the greater current passing through it and the amount of the deflection will depend upon the excess of current in the one wire over the current in the other wire. Now by twisting the two wires round one another as shown I am able to get them equidistant from the movable element or to express it more fully I am enabled to get the mean distances of the turns and twists of the wires practically equal so that the deflection shall vary with the difference of the currents in the two wires.

It will be seen that the two conductors are twisted round one another for some considerable distance towards each end after leaving the coil and that they are attached to separate terminals or binding screws 9, 10, 11, 12, mounted upon the insulating plates 13, 14 affixed to the bottom of the case 1.

The instrument illustrated in Fig. 1 constitutes an efficient leakage indicator. Thus if connected up so that the whole or a definite portion of the current in the positive conductor passes through the wire 6 and the whole or a definite proportion of that in the negative conductor passes through the wire 7 (the two currents of course going in opposite directions) there will be no deflection as long as the working conditions are normal but if the leakage should take place on one of the conductors then the balance will be upset. There will be a difference in the currents traversing the two wires 6, 7 and the movable element will be deflected in one direction or the other according as the leakage is from the outward or the return conductor. The instrument described may also be adapted to automatically check and obviate leakage from a conductor and I show one way of doing this in Figs. 2 and 3, Fig. 2 being a plan and Fig. 3 a part section.

On the arbor which carries the magnet 3 and parallel with it I place another magnet 20 above the coil. From the frame bar 21 I hang by means of the post 22 another bar 23 and upon this I mount the cocks 24. Between the said cocks 24 and the bar 23 I pivot the magnets 25 each of which carries two contact studs at one end. At each end of the bar 23 I attach in an insulated manner an arm or plate 26. To the sides of the bar 23 I attach in an insulated manner the arms 27. The arms 26 and 27 each bear contact studs for contacting with the magnets 25.

Let us assume that there is a slight leakage on one of the conductors either the outward or the return as the case may be and that this leakage is such that we desire to call attention to it but yet not sufficiently great to render it desirable to open the circuit. This leakage will cause a difference of current in the two coils and cause the magnet 3 and with it the magnet 20 to be deflected.

Let us assume that the deflection is such as to bring the magnet 20 into the direction shown by the line W X. The magnets 25 are so polarized that their extremities which are nearest to the magnet 20 are of the same polarity as the nearest ends of that magnet. The result of the deflection of magnet 20 into the position of the line W—X will be to move the magnet 25. (I am herein referring now only to that magnet which is shown at the left hand side of Fig. 2). This magnet will now be deflected so that one of its contact studs will contact with the contact stud on the left hand arm 26. Current will now pass from the battery 28 by lead 29, electric bell 30, lead 31, lead 32, contact arm 26, (left hand) magnet 25, bar 23, lead 33 to the other pole of the battery 28. The ringing of the bell 30 will draw attention to the leak which can subsequently be put right. Let us assume however that the leak is so serious that instead of merely having attention drawn to it it is necessary to break the circuit altogether. This I effect by means of the automatic cut-out 35 which may be of any convenient kind. To meet this case the parts are so placed with respect to one another that when leakage to the degree referred to takes place the magnets 3 and 20 are deflected beyond magnets 25, say to the position shown by the line Y—Z. This causes magnet 25 to be deflected in the other direction so that its contact stud now contacts with that on cock 27. Current now flows from battery 28, by lead 29, lead 34, cut-out 35, lead 36, lead 37, bar 23, lead 33, to the other pole of battery 28. The current through the cut-out 35 brings the latter into operation and automatically opens the main circuit.

I prefer to use an electro-magnetic cut out of one of the well known types in which current passing through an electro-magnet removes a detent which allows a weight or deflected spring to open the movable arm of a switch.

The bar 21 extends between the cheeks 40 of the coil. From what has been said it is unnecessary to describe the action when the magnets 3 and 20 are deflected in the opposite direction so as to move the magnet 25 which is shown on the right side of Fig. 2. The action is of course similar in each case.

It is obvious that there are many ways in which I may take advantage of the deflection of the magnet 3 to close a circuit to operate a cut-out or an electric bell. It is also obvious that for an electric bell any other convenient indicating device might be employed.

I have hereinbefore spoken of the circuit as consisting of two conductors one being the outward and the other the return conductor twisted round one another. It is of course obvious that each of these conductors instead of consisting of a single insulated wire may consist of a number of insulated wires and in practice I find it convenient to make up each of the two conductors, which constitute the circuit, of a number of separate conductors insulated from one another and each of these consisting of a number of small wires stranded together.

What I claim is:

1. In an electric measuring or indicating apparatus, the combination of a pair of conductors belonging to two distinct circuits and twisted on each other, a magnetized movable element, and a support for said element, said twisted conductors being coiled around the field of play of said element, substantially as described.

2. In an electric measuring or indicating apparatus, the combination of a pair of conductors belonging to two distinct circuits and twisted on each other, a magnetized movable element, said twisted conductors being spirally coiled around the field of play of said element, substantially as described.

3. The combination of a pair of conductors twisted on each other, a magnetized movable element, a support for said element, said twisted conductors being coiled around the field of play of said element, and an electric circuit comprising an alarm device and a magnetized circuit-closure disposed in operative proximity to the magnetized movable element, substantially as described.

4. The combination of a pair of conductors twisted on each other, a magnetized movable element, a support for said element, said twisted conductors being coiled around the field of play of said element, and an electric circuit comprising a cut-out and a magnetized circuit closure disposed in operative proximity to the magnetized movable element, substantially as described.

In testimony, that I claim the foregoing, I have hereunto set my hand this 3rd day of September, 1906.

JOHN WILLIAM MANLEY.

Witnesses:
 ERNST LAPPERT,
 H. D. JAMESON.